Dec. 29, 1925.  
E. M. COLE  
1,567,244  
AGRICULTURAL IMPLEMENT CONSTRUCTION  
Filed Feb. 2, 1924

Inventor  
Eugene M. Cole  
By J. Hanson Boyden,  
Attorney

Patented Dec. 29, 1925.

1,567,244

UNITED STATES PATENT OFFICE.

EUGENE M. COLE, OF CHARLOTTE, NORTH CAROLINA.

AGRICULTURAL IMPLEMENT CONSTRUCTION.

Application filed February 2, 1924. Serial No. 690,180.

*To all whom it may concern:*

Be it known that I, EUGENE M. COLE, a citizen of the United States, residing at Charlotte, in the county of Mecklenburg and State of North Carolina, have invented certain new and useful Improvements in Agricultural Implement Constructions, of which the following is a specification.

This invention relates to agricultural implements, and more particularly to implements embodying a wooden beam and a ground wheel, such, for example, as planters and fertilizer distributers.

The object of the invention is to provide simple, cheap and effective means for uniting and rigidly assembling the several parts of the implement, including the ground wheel bearings, the beam and the handle bars.

In order that the invention may be readily understood, reference is had to the accompanying drawing, forming part of this specification, and in which:—

Figure 1:
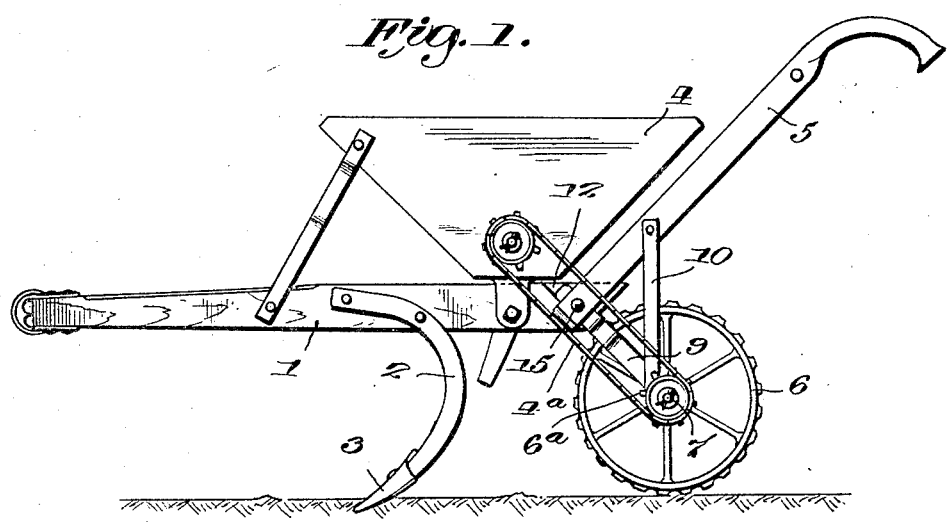
Figure 2:
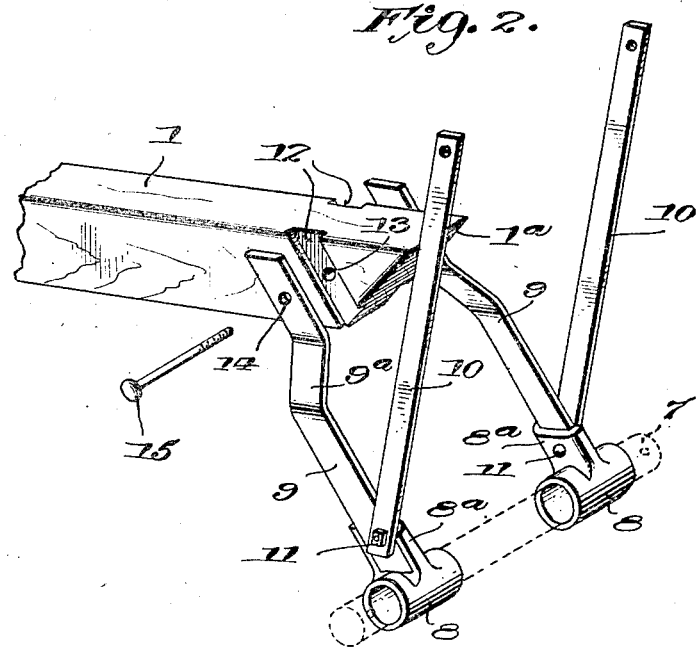

Figure 1 is a side elevation of a fertilizer distributer constructed in accordance with the invention; and Figure 2 is a fragmentary enlarged perspective view of the rear end of the beam, and associated parts, illustrating my improved construction in detail.

Referring to the drawings in detail, the fertilizer distributer shown by way of illustration comprises the usual wooden beam 1, plow shank 2, carrying at its end a shovel or furrow opener 3, a hopper 4, handle bars 5, and ground wheel 6. The ground wheel is mounted upon a shaft 7, to which is secured a sprocket 6ª, which drives the dispensing device or stirrer in the hopper by means of a sprocket chain 4ª.

For supporting the shaft 7, I provide a pair of special bearings or journal boxes 8, as clearly shown in Figure 2, formed by casting. Each of these bearings is provided with a lug 8ª, extending at right angles thereto, and recessed on one side to receive one end of a supporting arm 9. The other ends of the supporting arms 9 are offset inwardly by means of a bend, as indicated at 9ª, and are received in diagonally extending slots 12, formed in the opposite side faces of the beam 1.

A pair of braces 10 are also provided, extending from the handle bars to the bearings 8, the upper ends of these braces being bolted to the handle bars and the lower ends being secured to the supporting arms 9, and to the bearing lugs 8ª, by means of bolts 11. It will be noted that a single bolt 11 serves to rigidly unite the three parts 8ª, 9 and 10.

Extending horizontally through the beam 1, at a point within the slots 12, is a hole 13, and the upper ends of the arms 9 are provided with similar holes 14, adapted to register with the hole 13 when the parts are assembled. It will be noted that the depth of the slots 12 is substantially equal to the thickness of the supporting arms 9, these arms being relatively thin and flat in cross section, so that when seated in the slots, the outer surface of the arms is substantially flush with the side faces of the beam 1.

The lower ends of the handle bars 5 engage the sides of the beam 1, and are so positioned as to overlie the slots 12, and arms 9. These handle bars are also provided with holes which register with the holes 13 and 14, and when the parts are thus assembled, a single bolt 15 is passed through the alined holes, thus securely uniting and rigidly locking together the handle bars, supporting arms and beam. Preferably the rear end of the beam is beveled off, as indicated at 1ª in a plane substantially parallel with that of the handle bars.

The arms 9 and braces 10 are preferably formed of strap steel, and the above described manner of connecting these parts with each other and with the handle bars and beam results in a very rigid construction which is cheap to manufacture and exceptionally easy to assemble. The use of this construction renders unnecessary the employment of any castings other than the relatively small ones constituting the journal boxes or bearings 8.

What I claim is:—

1. The combination in an agricultural implement having a ground engaging element, of a pair of supporting arms for said element, said arms being of relatively thin flat cross-section, a wooden beam located between said arms and having at each side a notch to receive said arms, said notch being of substantially the same depth as the thickness of said arms, whereby the outer face of said arms lie substantially flush with the surface of the beam, a pair of handle bars fitted to the sides of the beam and overlying said notches and arms, and a bolt passing through said handle bars, arms, and beam and rigidly securing said parts together.

2. The combination, in an agricultural implement having a ground wheel, of a shaft on which said wheel is mounted, bearings in which said shaft is journaled, lugs formed on said bearings, a beam, handle bars secured to said beam, bearing supporting arms attached at one end to said beam, braces extending from said bearings to said handle bars, and a single bolt passing through the other end of the supporting arm, brace and bearing lug at each side of the implement, thus rigidly connecting said three parts together.

In testimony whereof I affix my signature.

EUGENE M. COLE.